United States Patent [19]

Suzuki et al.

[11] Patent Number: 5,712,319
[45] Date of Patent: Jan. 27, 1998

[54] RESIN COMPOSITION FOR LOW EXPANSION MOLDINGS

[75] Inventors: Makoto Suzuki; Osamu Matsumoto, both of Ibaraki-ken, Japan

[73] Assignee: Shin-Etsu Chemical Co., Ltd., Tokyo, Japan

[21] Appl. No.: 523,983

[22] Filed: Sep. 6, 1995

[30] Foreign Application Priority Data

Sep. 6, 1994 [JP] Japan .................. 6-238522

[51] Int. Cl.$^6$ .................. C08J 9/06; C08F 16/06
[52] U.S. Cl. .................. 521/141; 521/123; 521/128; 521/130; 521/143; 521/145; 521/146; 521/147; 521/149; 525/56; 525/57; 525/418; 525/451; 526/89; 526/173; 526/183; 526/217; 526/218.1; 526/219.6; 526/317.1; 526/328; 526/341; 526/344; 526/346
[58] Field of Search .................. 521/123, 130, 521/128, 143, 145, 146, 147, 149, 141; 526/89, 173, 183, 217, 218.1, 219.6, 317.1, 328, 341, 344, 346; 525/56, 57, 418, 451

[56] References Cited

U.S. PATENT DOCUMENTS 4,434,252  2/1984  Dorrestija et al. .................. 521/145
4,797,426  1/1989  Waki et al. .................. 521/145
4,800,214  1/1989  Waki et al. .................. 521/145

FOREIGN PATENT DOCUMENTS 45-29919  9/1970  Japan .

*Primary Examiner*—John M. Cooney, Jr.
*Attorney, Agent, or Firm*—Lowe, Price, LeBlanc & Becker

[57] ABSTRACT

A resin composition for low expansion moldings which comprises (A) 20 to 80 parts by weight of a vinyl chloride resin having an average degree of polymerization of from 500 to 1700 and (B) correspondingly from 80 to 20 parts by weight of a copolymer made of 60 to 90 parts by weight a polymerizable monomer mixture consisting of 20 to 40 wt % of acrylonitrile, 20 to 60 wt % of α-methylstyrene and 20 to 40 wt % of styrene and, correspondingly, 40 to 10 parts by weight of a crosslinked acrylic rubber. The resin composition further comprises (C) 0.5 to 30 parts by weight of an acrylic resin having a reduced viscosity of not less than 3.0 dl/g when measured by use of a chloroform solution of the acrylic resin at a concentration of 0.1 g/100 ml, (D) 0.1 to 10 parts by weight of a thermally decomposable rosining agent, and (E) from 1 to 10 parts by weight of a stabilizer, each based on 100 parts by weight of a mixture of the components (A) and (B).

12 Claims, No Drawings

RESIN COMPOSITION FOR LOW EXPANSION MOLDINGS

BACKGROUND OF THE INVENTION

1. Field of The Invention

This invention relates to a resin composition which is adapted for use in low expansion molding and is capable of yielding low expansion moldings. The moldings are useful as an outdoor building material and have good impact resistance, heat resistance, weatherability and flame retardancy with a specific gravity being in the range of 0.35 to 0.70 g/cm$^3$.

2. Description of the Prior Art

As is known in the art, low expansion moldings have a proper degree of heat insulation and smooth surfaces thereof and are relatively light in weight. In particular, low expansion moldings of polyvinyl chloride resins (hereinafter referred to simply as PVC resins) have utility as a synthetic woody material which is a substitute for natural wood materials and have, in fact, been in use as furniture, building materials and daily necessaries.

For the manufacture of the low expansion moldings, there is known an expansion extrusion molding process (i.e. a Celuka process) developed by Ugine Kuhlmann of France. The moldings obtained by the process are characterized by its relatively thick skin layer or non-expanded layer in the surface thereof. The moldings cover a diversity of profiles or shapes and have wide utility in the fields of cables, bench members, hollow pipes with different diameters, large-diameter pipes, sandwich panels, window frames and the like.

The low expansion moldings are usually made of PVC resins. When the resins are subjected to expansion extrusion molding according to the aforementioned method, disadvantages are involved in that the skin layer surface which is designed as angled becomes round at part of the angular portions, disenabling one to form a shape in conformity with that at a resin outlet of a die. Another disadvantage is that the resultant extrusion moldings have a low impact strength and have often suffered cracking on drilling for use as a building material.

To avoid the above disadvantages, attempts have been made to use, instead of the PVC resin, acrylonitrile-butadiene-styrene copolymers (hereinafter referred to simply as ABS resins). Although the initial impact strength is improved using the ABS resins, weatherability is so poor that the impact strength lowers as time passes.

In order that the skin layer is made thicker so as to increase the impact strength, the specific gravity of the resultant molding undesirably increases with the appearance being not in conformity with the shape of the die.

SUMMARY OF THE INVENTION

It is accordingly an object of the invention to provide a resin composition for low expansion molding which has good extrusion moldability.

It is another object of the invention to provide a resin composition for low expansion molding which is capable of yielding low expansion moldings having good impact resistance, heat resistance, flame retardancy and weatherability and having a specific gravity as low as 0.35 to 0.70 g/cm$^3$.

The above objects can be achieved, according to the invention, by a resin composition which comprises:

(A) 20 to 80 parts by weight of a vinyl chloride resin having an average degree of polymerization of from 500 to 1700;

(B) correspondingly from 80 to 20 parts by weight of a copolymer which is made of 10 to 40 parts by weight of a crosslinked acrylic rubber and correspondingly 90 to 60 parts by weight of a polymerizable monomer mixture consisting of 20 to 40 wt % of acrylonitrile, 20 to 60 wt % of α-methylstyrene, 20 to 40 wt % of styrene and 0 to 40 wt % of a methacrylic ester;

(C) 0.5 to 30 parts by weight of an acrylic resin having a reduced viscosity of not less than 3.0 dl/g when measured by use of a chloroform solution of the acrylic resin at a concentration of 0.1 g/100 ml;

(D) 0.01 to 10 parts by weight of a thermally decomposable foaming agent; and (E) from 1 to 10 parts by weight of a stabilizer wherein the amounts of the components (C), (D) and (E) are each based on 100 parts by weight of a mixture of the components (A) and (B).

DETAILED DESCRIPTION OF THE INVENTION

The vinyl chloride resins used as the component (A) in the composition of the invention include, for example, vinyl chloride homopolymer and vinyl chloride copolymers comprising not less than 50 wt % of vinyl chloride monomer and the balance being other monomer or monomers copolymerizable with vinyl chloride. The copolymerizable monomers include, for example, vinyl esters such as vinyl acetate, vinyl propionate and the like, acrylic esters such as methyl acrylate, ethyl acrylate and the like, methacrylic esters such as methyl methacrylate, ethyl methacrylate and the like, olefins such as ethylene, propylene and the like, acrylonitrile, styrene, vinylidene chloride, and the like.

The vinyl chloride resins should have an average degree of polymerization ranging from 500 to 1700. If the average degree of polymerization is less than 500, the resultant moldings obtained through expansion molding are poor in physical properties such as impact strength, tensile elongation and the like. On the contrary, when the average degree of polymerization exceeds 1700, the melt viscosity of the vinyl chloride resin becomes undesirably high at the time of the expansion molding. The resulting moldings are disadvantageous in that the expanded layer has a non-uniform cell state with a poor appearance and that the specific gravity of the moldings becomes high.

The vinyl chloride resin should preferably have an average degree of polymerization of from 600 to 1300.

The copolymer used as the (B) component is one which is obtained by copolymerizing 60 to 90 parts by weight of a polymerizable monomer mixture consisting of 20 to 40 wt % of acrylonitrile, 20 to 60 wt % of α-methylstyrene, 20 to 40 wt % of styrene and, optionally, up to 40 wt % of a methacrylic ester in coexistence with, correspondingly, 40 to 10 parts by weight of a crosslinked acrylic rubber.

The crosslinked acrylic rubber consists of a crosslinked alkyl acrylate polymer. The monomer used for preparing the polymer includes, for example, alkyl acrylates whose alkyl moiety has 1 to 13 carbon atoms such as n-butyl acrylate, ethyl acrylate, propyl acrylate, hexyl acrylate, 2-ethylhexyl acrylate and the like. These alkyl acrylates may be used singly or in combination.

The alkyl acrylate polymers should be crosslinked. If the polymers are not crosslinked, the resultant moldings become low in impact resistance with a poor appearance.

In order to introduce a crosslinking structure into the alkyl acrylate polymer, a polyfunctional monomer which has at least two functional groups copolymerizable with the alkyl acrylate is copolymerized with the alkyl acrylate. Such polyfunctional monomers include polyvalent vinyl compounds or polyvalent allyl compounds such as triallyl cyanurate, triallyl isocyanurate, divinylbenzene, ethylene glycol dimethacrylate and the like, mixtures thereof.

The copolymer used as the (B) component is obtained by copolymerizing 60 to 90 parts by weight of a polymerizable mixture consisting of 20 to 40 wt % of acrylonitrile, 20 to 60 wt % of α-methylstyrene, 20 to 40 wt % of styrene and, optionally, up to 40 wt % of a methacrylic ester in coexistence with, correspondingly, 40 to 10 parts by weight of the crosslinked acrylic rubber.

If the ratio of the crosslinked acrylic rubber to the polymerizable monomer mixture exceeds 40:60 on the weight basis, the resulting low expansion moldings lower in heat resistance. On the contrary, when the ratio by weight of the acrylic rubber is less than 10:90 relative to the polymerizable monomer mixture, the impact strength lowers. It is preferred that the ratio by weight between the crosslinked acrylic rubber and the polymerizable monomer mixture is in the range of 30/70 to 20/80.

If the content of acrylonitrile in the monomer mixture is less than 20 wt %, the heat resistance lowers. When the content exceeds 40 wt %, working properties lower, adversely influencing the shape of the resulting moldings. In particular, disadvantages arise in that angular or sharp portions of moldings will become rounded.

If the content of α-methylstyrene in the monomer mixture is less than 20 wt %, the heat resistance of the resulting moldings lowers. On the contrary, when the content exceeds 60 wt %, not only the impact strength lowers, but also copolymerization is unlikely to proceed.

When the content of styrene in the monomer mixture is less than 20 wt %, the fluidity of a resin melt during the course of molding undesirably lowers. In contrast, when the content exceeds 40 wt %, the heat resistance lowers.

It is preferred that the total of α-methylstyrene and styrene should be in the range of from 40 to 80 wt % of the polymerizable monomer mixture.

The methacrylic esters are optionally added to the monomer mixture and include, for example, alkyl methacrylates such as methyl methacrylate, butyl methacrylate and the like. By the addition, working properties are improved. However, if the content of methacrylic esters exceeds 40 wt %, the impact resistance unfavorably lowers.

In the practice of the invention, the (B) component is added in amounts of from 80 to 20 parts by weight correspondingly to 20 to 80 parts by weight of the (A) component. If the ratio of the (A) component and the (B) component (i.e. (A) component/(B) component) exceeds 80/20, the resultant moldings lower in heat resistance and may cause a poor appearance. On the contrary, when the ratio is less than 20/80, the flame retardancy unfavorably degrades.

It is preferred that the ratio by weight between the (A) component and the (B) component is in the range of 70:30 to 30:70.

The acrylic resins used as the (C) component should be one which has a reduced viscosity of not lower than 3.0 dl/g when determined at 20° C. using a chloroform solution having a concentration of 0.1 g of acrylic resin in 100 ml of chloroform.

When using the thus appropriately controlled melt viscosity of the resin, cells are prevented from being combined under high temperature conditions or from shrinkage after formation thereof. Moreover, gases generated during expanding or foaming are rapidly dispersed throughout the resin melt to create fine and uniform cells. In addition, the resultant expanded moldings have an intended specific gravity of from 0.35 to 0.70 g/cm$^3$, preferably from 0.50 to 0.70 g/cm$^3$.

The acrylic resins used for this purpose include methyl methacrylate polymer or copolymers comprised mainly of methyl methacrylate units. Examples of the copolymers include those copolymers of methyl methacrylate and monomers copolymerizable therewith such as methyl acrylate, ethyl acrylate, n-butyl acrylate, isobutyl acrylate, 2-ethylhexyl acrylate or the like. Moreover, copolymers of methyl methacrylate, those monomers mentioned above and monomers copolymerizable therewith may also be used.

The amount of the (C) component is in the range of from 0.5 to 30 parts by weight, preferably from 2 to 10 parts by weight, per 100 parts by weight of the total of the (A) and (B) components.

The effect of the (C) component is facilitated when used in combination with the (D) component which is a thermally decomposing expanding agent. The use of the (D) component leads to low expansion moldings which has a good appearance and a uniform, fine cell structure can be obtained.

The thermally decomposing expanding agent used as the (D) component serves to form a uniform, fine cell structure which is formed during the course of expansion moldings and thus, serves as a cell uniformizing aid. The resultant cellular moldings are very unlikely to crack when driven with nuts or nails therein. The (D) component includes, for example, azo expanding agents such as azodicarbonamide, azobisisobutyronitrile, diazoaminobenzene and the like, nitroso expanding agents such as N,N'-dimethyl-N,N'-dinitroterephthalamide and the like, sodium bicarbonate, and the like. In order to obtain low expansion moldings, sodium bicarbonate is most preferred. The amount of the (C) component is in the range of from 0.01 to 10 parts by weight, preferably from 1 to 5 parts by weight, per 100 parts by weight of the total of the (A) and (B) component. If the amount is less than 0.01 part by weight, the resultant moldings may not become uniform or fine in cell structure. On the contrary, when the mount exceeds 10 parts by weight, the expansion proceeds relatively violently, thus worsening the surface state of the resulting moldings.

The stabilizers used as the (E) component include, for examples, organic tin stabilizers such as of laurates, maleates, mercaptides and the like, metallic soap stabilizers calcium stearate, barium stearate, lead stearate and the like, and lead stabilizers such as tribasic lead sulfate, lead silicate, tribasic lead phosphite and the like. These stabilizers are those ordinarily used in this art.

The amount of the (E) component is in the range of from 1 to 10 parts by weight per 100 parts by weight of the total of the (A) and (B) components. If the amount is less than 1 part by weight, it is difficult to prevent the resin composition being extruded from decomposition and degradation. When the amount exceeds 10 parts by weight, no further effect is obtained.

The low expansion resin composition of the invention may further comprise, aside from the four essential components, nucleators such as calcium carbonate, talc, barium sulfate, silica, titanium oxide, mica, sericite, alumina, bentonite, diatomaceous earth, lead acetate and the like. These nucleators enable one to obtain expanded moldings which are finer in cell or cell structure. The nucleator is preferably added in an amount of from 0.01 to 20 wt % based on the total of the (A) and (B) components.

If necessary, other various additives may be added to the resin composition and include, for example, stabilization aids, lubricants, flame retardants, colorants, UV absorbing agents, antioxidants and the like.

The extrusion molding of the low expansion resin composition of the invention is favorably effected according to the Celuka process set out in Japanese Patent Publication No. 45-29919.

As set forth in the above publication, this molding method is performed using a series of devices including extruder-extrusion die-cooling sizing die-cooling machine-takeup rolls. A torpedo is fixed within the extrusion die and a resin melt is compressed by means of the torpedo in a non-expanded state and is extruded from the fine die nozzle in a hollow state. Then, the extruded resin is quenched by means of the sizing die having substantially the same size as the outlet of the extrusion die, by which the outer surface layer is provided as a non-expanded skin layer having a thickness of 8.0 to 5.0 mm. The resin in the inside of the extruded material is abruptly expanded to provide an expanded layer. The non-expanded skin layer is so formed that the resultant molding has good mechanical strength and impact resistance and is thus adapted for use as outdoor building materials.

The present invention is more particularly described by way of examples, which should not be construed as limiting the invention thereto.

EXAMPLES 1 TO 6 AND COMPARATIVE EXAMPLES 1 TO 6

Components (A), (B), (C) and (D) whose formulations are indicated in Table were charged into a super mixer with a capacity of 30 liters and mixed therein. When the resin temperature in the mixer reached 120° C., the resin melt was discharged into a cooling mixer with a capacity of 500 liters. After the resultant compound had been cooled down to 50° C., sodium bicarbonate used as (D) component was added to the mixture and mixed.

On the other hand, a 50 mmφ monoaxial extruder having a screw with a L/D value of 23 and a C.R. (compression ratio) value of 2.5 was provided. The extruder was attached at the outlet side thereof with a mandrel with an outer diameter of 40 mm, a die having a resin outlet with a size of 40 mm in width and 20 mm in length, a sizing die having an opening similar to that of the die (i.e. a cooling die), and a cooling vessel in this order. In order to take out extrusion moldings from the sizing die, a caterpillar was attached downstream of the cooling vessel.

The respective mixtures were supplied to the monoaxial extruder and the temperatures of the extruder to the dies (i.e. extruder cylinder portions: $C_1$ to $C_4$ and die portions: $D_1$ and $D_2$) were set at values indicated in the table. Then, each mixture was extruded at revolutions of the screw of 30 r.p.m., and the resulting extrusion moldings were taken out by means of the caterpillar at a rate of 0.5 m/minute.

In the sizing die, water was circulated to cool the extrusion moldings to normal temperatures. The moldings obtained by the extrusion having a section of 40 mm in width and 20 mm in length had a non-expanded outer skin layer and a porous expanded or cellular layer in the inside thereof.

The thus obtained moldings were subjected to evaluation of the thickness of the surface layer (non-expanded layer), weatherability, Vicat softening point, flame retardancy and specific gravity according to the following test methods. In addition, the expanded layer of each molding was visually observed with respect to the cell state along with an appearance of the extrusion molding. The results are shown in the table.

The employed components and test methods are described in detail.

Components (A) component: vinyl chloride resin (abbreviated as PVC resin in the table)

A-1: TK-600 (commercial name of Shin-Etsu Chemical Industry Co., Ltd. with an average degree of polymerization of 600)

A-2: TK-600 (commercial name of Shin-Etsu Chemical Industry Co., Ltd. with an average degree of polymerization of 2510)

(B) component: acrylonitrile-acrylic rubber-styrene copolymer resin (hereinafter abbreviated as AAS resin in the table)

B-1: Vitax 6815 (commercial name of Hitachi Chemical Co., Ltd., having a composition of 20 wt % of crosslinked acrylic rubber, 25 wt % of acrylonitrile, 25 wt % of α-methylstyrene, and 30 wt % of styrene)

B-2 Vitax 6700AVX (commercial name of Hitachi Chemical Co., Ltd., having a composition of 20 wt % of crosslinked acrylic rubber, 20 wt % of acrylonitrile, and 60 wt % of styrene)

(C) component: acrylic resin

C-1: methyl methacrylate-n-butyl acrylate copolymer (having 80 wt % of methyl methacrylate and 20 wt % of n-butyl acrylate) with a reduced viscosity of 11.5 dl/g when determined using a chloroform solution having a concentration of 0.1 g of the copolymer in 100 ml of chloroform.

C-2: methyl methacrylate polymer with a reduced viscosity of 10.0 dl/g when determined using a chloroform solution having a concentration of 0.1 g of the copolymer in 100 ml of chloroform.

(D) component: sodium bicarbonate (E) component: calcium stearate, butyltin mercapto-based stabilizer (abbreviated as tin stabilizer in the table)

Test Methods

Measurement of surface layer (non-expanded layer) thickness:

The thickness of the non-expanded layer along the width and length in section of each molding was measured by use of a slide caliper and expressed as an average value of the measurements.

Weatherability Test

Thirty test pieces each having a size of 3 mm in thickness×12.7 mm in width×150 mm in length were taken out from the surface layer (non-expanded layer) portion of each molding and allowed to stand in a sunshine Weather-O-meter described in JIS A 1415. The samples which had been allowed to stand for 0 hours, 500 hours and 1000 hours were subjected to an impact resistance test based on an Izod impact strength test described in JIS K 7110. The impact resistance was expressed in terms of an average value of ten impact measurements.

Vicat Softening Temperature 3 mm thick test pieces were taken out from the surface layer (non-expanded layer) portion of each molding and subjected to a Vicat softening temperature under a load of 1 kg according to the method described in JIS K 7206.

Flame Retardancy Test 3 mm thick sheets were taken out from the surface layer (non-expanded layer) portion of each molding to provide test pieces having a width of 65 mm and a length of 110 mm. The test pieces were subjected to a flame test using an oxygen index according to the method described in JIS K 7201.

In the flame test, the oxygen index of a non-flammable resin was less than 2.0 and the oxygen index of a resin imparted with flame retardancy was not smaller than 23.0.

Evaluation of an Appearance of Moldings

The angular portions (edge portions) at the surfaces of moldings were observed to evaluate the appearance according to the following standards A: the edge portions were with accurate angles formed according to the shape of the die.

B: the edge portions were partially rounded and were not with accurate angles formed according to the shape of the die.

The results are shown in the table below.

TABLE

| | | Ex. 1 | Ex. 2 | Ex. 3 | Comp. Ex. 1 | Comp. Ex. 2 | Comp. Ex. 3 | Comp. Ex.4 | Comp. Ex.5 |
|---|---|---|---|---|---|---|---|---|---|
| Additive Components: | | | | | | | | | |
| (A) PVC resin | kind | A-1 | A-1 | A-1 | A-1 | A-1 | A-2 | A-1 | A-1 |
| | parts by weight | 50 | 70 | 50 | 50 | 50 | 50 | 100 | 5 |
| (B) AAS resin | kind | B-1 | B-1 | B-1 | B-1 | B-2 | B-1 | — | B-1 |
| | parts by weight | 50 | 30 | 50 | 50 | 50 | 50 | 0 | 95 |
| (C) Acrylic resin | kind | C-1 | C-1 | C-2 | — | C-1 | C-1 | C-1 | C-1 |
| | parts by weight | 4 | 4 | 4 | 0 | 4 | 4 | 4 | 4 |
| (D) Sodium bucarbonate | parts by wt. | 2 | 2 | 2 | 2 | 2 | 2 | 2 | 2 |
| (E) Calcium stesrate | parts by weight | 2 | 2 | 2 | 2 | 2 | 2 | 2 | 2 |
| Tin stabilizer | parts by weight | 2 | 2 | 2 | 2 | 2 | 2 | 2 | 2 |
| Extrusion Conditions | | | | | | | | | |
| Cylinder temperature | C1(°C.) | 90 | 90 | 90 | 90 | 90 | 90 | 90 | 90 |
| | C2(°C.) | 110 | 110 | 110 | 110 | 110 | 110 | 110 | 110 |
| | C3(°C.) | 130 | 130 | 130 | 130 | 130 | 130 | 130 | 130 |
| | C4(°C.) | 150 | 150 | 150 | 150 | 150 | 150 | 150 | 150 |
| Die temperature | D1(°C.) | 185 | 185 | 185 | 185 | 185 | 185 | 185 | 185 |
| | D2(°C.) | 180 | 180 | 180 | 180 | 180 | 180 | 180 | 180 |
| Test results: | | | | | | | | | |
| Thickness of surface layer | (mm) | 3.7 | 4.4 | 4.1 | 7.2 | 3.9 | 7.2 | 3.6 | 4.5 |
| Weather ability test | blank | 120 | 115 | 120 | 120 | 125 | 146 | 80 | 145 |
| (kg.cm/cm$^2$) | 500 hours | 120 | 115 | 120 | 120 | 125 | 146 | 81 | 145 |
| | 1000 hours | 117 | 112 | 117 | 117 | 121 | 132 | 75 | 138 |
| Vicat softening point | (°C.) | 103 | 100 | 104 | 103 | 93 | 104 | 87 | 115 |
| Flame retardancy test | oxygen index | 24.1 | 25.4 | 24.0 | 24.2 | 19.0 | 24.4 | 36.8 | 18.0 |
| Specific gravity of molding | (g/cm$^3$) | 0.58 | 0.65 | 0.62 | 1.00 | 0.62 | 1.03 | 0.58 | 0.62 |
| Cell state of expanded layer of molding | | A | A | A | B | A | B | A | A |
| Appearance of molding | | A | A | A | B | A | B | B | A |

Note: In Comparative Example 1, a gas escaped from the die portion during extrusion molding.

Specific Gravity of Moldings 2 g of samples was cut out from the whole of moldings and subjected to measurement of a specific gravity according to the method described in JIS K 7112A.

Observation of a Cell State of Expanded Layer of Each Molding

The cell state of an expanded layer portion of each molding was observed evaluated according to the following standards.

A: a fine, uniform cell structure having a cell diameter of not larger than 100 μm with a good appearance.

B: a coarse, non-uniform cell structure having a cell diameter of not smaller than 1000 μm.

As will be apparent from the results of the table, the resin compositions of the invention are better in extrusion moldability and the moldings obtained from the compositions are better in impact and heat resistances, weatherability and flame retardancy with a specific gravity being in the range of from approximately 0.35 to 0.70 g/cm$^3$.

What is claimed is:

1. A resin composition for low expansion moldings which comprises:
    (A) 20 to 80 parts by weight of a vinyl chloride resin having an average degree of polymerization of from 500 to 1700;
    (B) correspondingly from 80 to 20 parts by weight of a copolymer which is made of 10 to 40 parts by weight of a crosslinked acrylic rubber and correspondingly 90 to 60 parts by weight of a polymerizable monomer mixture comprising 20 to 40 wt % of acrylonitrile, 20 to 60 wt % of α-methylstyrene, 20 to 40 wt % of styrene and 0 to 40 wt % of a methacrylic ester;

(C) 0.5 to 30 parts by weight of an acrylic resin having a reduced viscosity of not less than 3.0 dl/g when measured by use of a chloroform solution of the acrylic resin at a concentration of 0.1 g/100 ml;

(D) 0.1 to 10 parts by weight of a thermally decomposable foaming agent; and (E) from 1 to 10 parts by weight of a stabilizer wherein the amounts of the components (C), (D) and (E) are each based on 100 parts by weight of a mixture of the components (A) and (B); wherein said resin composition has a specific gravity ranging from 0.35 to 7.0 g/cm$^3$.

2. A resin composition according to claim 1, wherein a ratio by weight between the (A) and (B) components is in the range of 70:30 to 30:70.

3. A resin composition according to claim 1, wherein said crosslinked acrylic rubber is made of a copolymer consisting essentially of at least one alkyl acrylate whose alkyl moiety has from 1 to 13 carbon atoms, and at least one polyfunctional monomer.

4. A resin composition according to claim 1, wherein the total amount of α-methylstyrene and styrene in the (B) component is in the range of from 40 to 80 wt %.

5. A resin composition according to claim 1, wherein the (C) component is at least one member selected from the group consisting of methyl methacrylate polymer and copolymers comprising methyl methacrylate.

6. A resin composition according to claim 1, wherein the (D) component consists of sodium bicarbonate.

7. A molded article obtained from the resin composition defined in claim 1, wherein said article has a specific gravity ranging from 0.35 to 0.70 g/cm$^3$.

8. A molded article according to claim 7, wherein a ratio by weight between the (A) and (B) components of said resin is in the range of 70:30 to 30:70.

9. A molded article according to claim 7, wherein said crosslinked acrylic rubber of said resin is made of a copolymer consisting essentially of at least one alkyl acrylate whose alkyl moiety has from one to 13 carbon atoms, and at least one polyfunctional monomer.

10. A molded article according to claim 7, wherein the total amount of α-methylstyrene and styrene in the (B) component of said resin is in the range of from 40 to 80 weight percent.

11. A molded article according to claim 7, wherein the (C) component of said resin is at least one member selected from the group consisting of methyl methacrylate polymer and copolymers comprising methyl methacrylate.

12. A molded article according to claim 7, wherein the (D) component of said resin consists of sodium barcarbonate.

* * * * *